(12) United States Patent
Elliott et al.

(10) Patent No.: US 10,424,174 B2
(45) Date of Patent: Sep. 24, 2019

(54) QUANTITATIVE DOCUMENT TAMPERING PROTECTION AND MONITORING SYSTEM UTILIZING WEIGHT AND VIDEO

(71) Applicants: Acuity-vct, Inc., Westlake, OH (US); Michael Lawrence Elliott, Westlake, OH (US)

(72) Inventors: Michael Lawrence Elliott, Westlake, OH (US); Randolph Allen Stankie, Brecksville, OH (US); Daniel Joseph Lazuta, Akron, OH (US)

(73) Assignee: ACUITY-VCT, INC., Westlake, OH (US)

(\*) Notice: Subject to any disclaimer, the term of this patent is extended or adjusted under 35 U.S.C. 154(b) by 0 days.

(21) Appl. No.: 16/047,493

(22) Filed: Jul. 27, 2018

(65) Prior Publication Data

US 2019/0035239 A1    Jan. 31, 2019

Related U.S. Application Data

(60) Provisional application No. 62/537,709, filed on Jul. 27, 2017.

(51) Int. Cl.
*H04N 5/77* (2006.01)
*H04N 7/18* (2006.01)
(Continued)

(52) U.S. Cl.
CPC ....... *G08B 13/1472* (2013.01); *G01G 19/414* (2013.01); *G06F 16/2228* (2019.01); *G06F 16/245* (2019.01); *G06F 16/71* (2019.01); *G08B 13/19608* (2013.01); *G08B 13/19669* (2013.01); *H04N 5/77* (2013.01); *H04N 7/181* (2013.01); *H04N 7/188* (2013.01); *G01G 23/36* (2013.01); *G06F 3/0482* (2013.01); *H04N 5/247* (2013.01)

(58) Field of Classification Search
CPC .......... G08B 13/1472; G08B 13/19669; G08B 13/19608; G06F 17/30321; G06F 17/30424; G06F 17/30858; G06F 3/0482; H04N 7/188; H04N 5/77; G01G 19/414
USPC ................. 386/226, 227; 348/92, 86, 91, 64
See application file for complete search history.

(56) References Cited

U.S. PATENT DOCUMENTS

| 8,774,262 | B2* | 7/2014 | Bhoja | H03H 15/00 375/224 |
| 2018/0121475 | A1* | 5/2018 | Asbi | G06F 16/24564 |

\* cited by examiner

*Primary Examiner* — Robert Chevalier
(74) *Attorney, Agent, or Firm* — Fay Sharpe LLP

(57) ABSTRACT

A security system for quantitatively verifying a condition of items in a special collections inventory includes a scale in connection with an index of special collection items. Every item in the index has a unique weight within a collection. The scale takes a current weight measurement of a special collections item and automatically reports the current weight measurement to the computing device hosting the index. Using the current weight measurement, the index is searched for a given item by comparing the current weight measurement with a set of indexed reference weights. In response to a match being detected between the current weight measurement and a reference weight among the set of indexed reference weights, a physical condition of the given item—corresponding with the reference weight—is verified as being intact. In response to no match being detected between the current weight measurement and the set of indexed reference weights, an alarm event triggers indicating that the special collections item has been tampered with.

20 Claims, 6 Drawing Sheets

(51) Int. Cl.
    *G08B 13/14*         (2006.01)
    *G08B 13/196*      (2006.01)
    *G01G 19/414*      (2006.01)
    *G06F 16/71*        (2019.01)
    *G06F 16/245*      (2019.01)
    *G06F 16/22*        (2019.01)
    *G01G 23/36*         (2006.01)
    *G06F 3/0482*       (2013.01)
    *H04N 5/247*        (2006.01)

QUANTITATIVE DOCUMENT TAMPERING PROTECTION AND MONITORING SYSTEM UTILIZING WEIGHT AND VIDEO

This application claims priority from Provisional Application Ser. No. 62/537,709, filed on Jul. 27, 2017, the entirety of which is hereby incorporated by reference herein.

BACKGROUND

The present exemplary embodiments relate to a security video system for quantitatively tracking and verifying the condition of special collections' inventories. Embodiments find particular application in conjunction with an electronic index, catalog or classification system that is used to track rare items in special collections, and will be described with particular reference thereto. However, it is to be appreciated that the embodiments are also amenable to other like applications.

Many universities, libraries, museums, and historical societies (collectively referred to as "facilities") house special collections of rare books, manuscripts, printed materials, and artifacts. The collections do not circulate, and are held in closed storage. While special collections are generally off limits to the public, many facilities allow the items to be consulted in a designated reading room. The items cannot leave the facility.

Strict procedures are in place for viewing special collections. For example, access may be restricted to scholars and researchers; access may be restricted by appointment; the viewing may be monitored by an attendant; detailed identification information may be required of the patron; writing instruments may be prohibited; and back packs, brief cases, and heavy apparel may be restricted in the reading room. Additionally, the reading rooms are under camera surveillance.

The current procedures are employed to deter theft and tampering because many of the items in special collections are original, irreplaceable, valuable, and/or priceless. If stolen, an item can be lost for years if it is not listed on a market.

The current security measures are largely effective for protecting against theft of an item in special collections. A partial theft—that is, the removal of only a portion of the item—is a more difficult crime to protect against. The theft of pages, a single page, or even a portion of a page from a rare document—for illustrative purposes—can go unnoticed for years after the incident occurred. For example, instances are reported where a theft was only discovered during an insurance appraisal, and the items were missing for an indeterminable amount of time at that point. This delay between the tampering and the discovery makes an investigation of the theft extremely difficult to conduct, and recovery of a stolen portion nearly impossible to obtain.

The current investigation relies on surveillance footage that is captured by a video monitoring system. The video monitoring system operates independent of the indexing system, which is used by the facility to store and retrieve items. If a portion of a special collection item is found missing, the troubleshooting process is quite rigorous. First, an investigator has to search the library records to determine the times when the item was checked out, and by whom and to which reading table the item was assigned. Once armed with this information, the investigator has to access the video system; determine the cameras associated with the reading table; and review the video over the time frames when the item was checked out. This process must be repeated for every patron that checked the item out, sometimes over periods of years or decades. Additionally, the process can be complicated by grainy or pixelated video evidence. And, the theft may be obscured by objects in the camera field of view. Depending on the camera placement, motion-based video cameras may not record evidence if the motion-detection algorithm fails to detect movement. For example, the theft activity is represented by too few pixels in the video frame to be detected, for example, when the theft occurs far from the camera. In short, skilled thieves may have been able to avoid and work around video surveillance.

Currently a manual, visible inspection is also relied upon to verify that material is returned intact. There is no automated system in place to immediately identify tampering, or to launch an investigation upon a potential incident of tampering. There is no monitoring system in place that integrates with an indexing system of a facility. An improved system and method are therefore desired for performing these operations.

BRIEF DESCRIPTION

One embodiment of the disclosure is directed to a security system for quantitatively verifying a condition of items in a special collections inventory, where the items are made available for consultation. The system includes a scale that is in connection with an index of special collection items, which is stored on a computing device in communication with the scale. The scale takes a current weight measurement of a special collections item and automatically reports the current weight measurement to the computing device. The system further includes a non-transitory storage device having stored instructions thereon and at least one hardware processor being part of the computing device and configured to execute the instructions. The hardware processor executes instructions for accessing the index of special collections items. Every item in the index has a unique weight within a collection. Using the current weight measurement, the processor searches the index for a given item by comparing the current weight measurement with a set of indexed reference weights. In response to a match being detected between the current weight measurement and a reference weight among the set of indexed reference weights, the processor identifies the given item corresponding with the reference weight and verifies a physical condition of the given item as being intact. In response to no match being detected between the current weight measurement and the set of indexed reference weights, the processor triggers an alarm event indicating that the special collections item has been tampered with.

Another embodiment of the disclosure is directed to a computer-implemented method for quantitatively verifying a condition of items in a special collections inventory made available for consultation. A scale is operatively connected to a server computer having a processor. The scale takes a current weight measurement of a special collections item and automatically reports the current weight measurement to the server computer. The server computer hosts an index of the special collections items. Every item in the index has a unique weight within a collection. Using the current weight measurement, the processor searches the index for a given item by comparing the current weight measurement with a set of indexed reference weights. In response to a match being detected between the current weight measurement and a reference weight among the set of indexed reference weights, the processor identifies the given item corresponding with the reference weight and verifies a physical condition of the given item as being intact. In response to no match between the current weight measurement and the set of indexed reference weights, the processor triggers an alarm event indicating that the special collections item has been tampered with.

DETAILED DESCRIPTION

The present exemplary embodiments relate to an automated security system for quantitatively verifying the physical condition of items housed in special collections. Particularly, the system uses a weight measurement to verify that consulted material is retrieved and/or returned fully intact. The system integrates a scale with an electronic index used to track rare items in a particular collection. Each item in the index is associated with a unique weight within the collection. The system is operative to identify a potential incident of tampering when the item's weight measurement does not match its unique weight. "Tampering" as used herein refers to any damage to the item or any change in the item condition. Tampering also encompasses partial theft. The system triggers an alarm event, and immediately launches an investigation, upon the potential incident of tampering.

Figure 1:
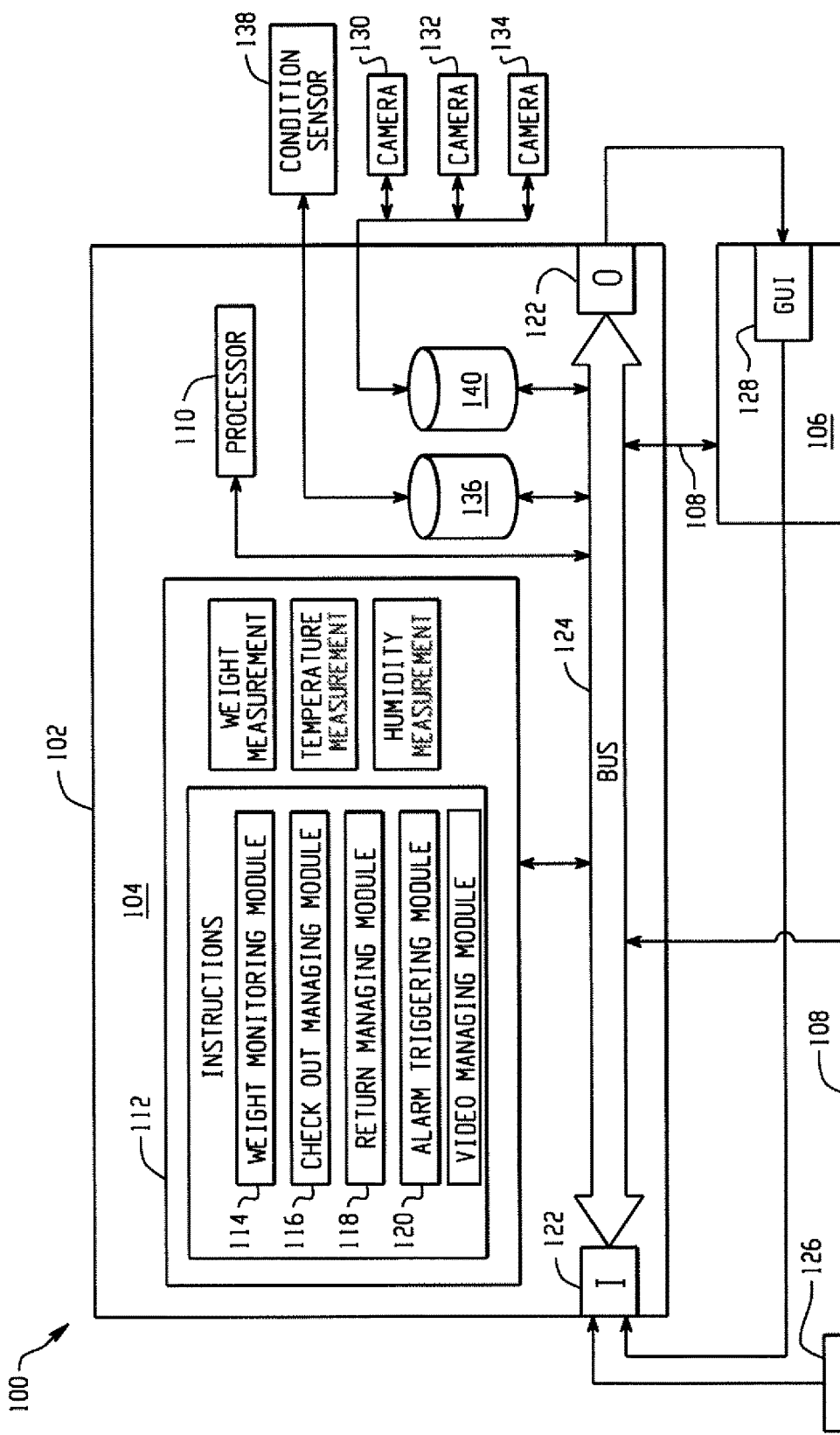
FIG. 1 is a schematic illustration of a security and alarm system according to one aspect of an exemplary embodiment.

With reference to FIG. 1, a functional block diagram of a networked security system 100 is illustrated. The security system 100 includes a tamper detection system 102, hosted by a computing device 104, such as a local server computer at a facility; a scale 126; and at least one user device 106, which are connected by communication links 108, which may be referred to collectively as a network. These components are described in greater detail below.

The server or computer device 104 illustrated in FIG. 1 includes at least one processor 110, which controls the overall operation of the security system 100 by operation of computer or processor readable processing instructions, which are stored in at least one memory 112 connected to the at least one processor 110 (referred to herein below as the "hardware processor".

The security monitoring and alarm triggering processes disclosed herein are performed by the processor 110 according to the instructions stored in the at least one memory 112 (referred to herein below as the "memory"). In particular, the memory 112 stores computer or processor readable instructions for a weight monitoring module 114; a check-out managing module 116; a return managing module 118; and an alarm triggering module 120.

The weight monitoring module 114 receives the weight measurements of indexed items; updates weights records of the indexed items; and maintains historical data of the measured weight of the indexed items.

The check-out managing module 116 receives the weight of an item being checked out; identifies the item from the archived items using the weight; determines potential tampering of the item while it was in storage; and initiates an investigation procedure if it determines the item was tampered with while in storage.

The return managing module 118 receives the weight of an item being returned; determines potential tampering of the returned item; initiates an investigation in the instance of a detected alarm event; and builds historical data over the check-out period.

The alarm triggering module 120 launches an interactive user interface in response to an alarm event; and transmits video evidence to a playback device.

Embodiments can implemented a single processing device or as a set of interworking devices. The modules 114-120 will be later described with reference to the exemplary method.

The tamper detection system 102 also includes one or more communication interfaces (I/O), such as network interfaces 122 for communicating with external devices, such as the user device 106. The communication interfaces 122 may include, for example, a modem, a router, a cable, and/or Ethernet port, etc. The interfaces 122 are adapted to receive at least weight measurements as input. The various hardware components 110, 112, 122 of the server computer may be connected by a bus 124.

The system 100 uses scale weights to quickly identify a special collections item, and to verify a condition of the item. With continued reference to FIG. 1, the system 102 is communicatively linked to a high precision grade scale 126 that is operative to accurately measure the weight of an item, for example, with a precision of a fraction of a milligram. For instance, the scale 126 may be operative to measure the weights precisely enough to allow the system to detect weight changes small enough that they might be associated with the addition of an ink mark on a page. In one embodiment, the scale is a laboratory scale, such as, Ohaus or Mettler Toledo Laboratory scales (model based on maximum weight of artifacts). The scale 126 reports weights of item to the processor 110.

With continued reference to FIG. 1, system 102 is communicatively linked to a user interface device (GUI) 128 via a wired and/or wireless link. In various embodiments, the user interface device 128 may include one or more of a display device, for displaying information to users, such as a notification of a potential tampering and/or theft incident; a playback device, for displaying video evidence for the user to review; and, a user input device—such as a keyboard or touch or writable screen—and/or a cursor control device—such as a mouse, trackball, or the like—for communicating user input information and command selections to the processor 110. Specifically, the user interface device 128 includes at least one of an input device and an output device, both of which include hardware, and which are communicatively linked with the computer or server 104 via wired and/or wireless link(s). In some embodiments, the user interface device 128 is part of the user device 106.

In some embodiments, the user device 106 is a computing device that can include, for example, a server computer, desktop, laptop, or tablet computer. The user device 106 is may be for use by a librarian or archivist to assist with the check-out procedure for an item from special collections. For example, the user input device can be connected to the user device 106 for receiving item information as a form of input provided by action of the user, or from a scanner in communication with the user device, etc. Such information may include item identification information (e.g., creator, title, owner, creation date, etc.) and/or patron information.

While the server computer 104 can be linked to as few as three image capture devices 130, 132, 134, there is no limitation made to the number of image capture devices employed by the system. In an illustrative embodiment, two categories of image capture devices are employed in the system 100. At least one high resolution surveillance camera 130 (such as, a "motion detection video camera 130") monitors the entire region of interest, including the reading room. This camera records when triggered by observed motion and monitors patrons as they move to and from the reading tables. The motion detection video camera(s) 130 also monitors the staff and interactions between the staff and patrons. Camera(s) 130 captures the reading room in the field of view and, more particularly, the check-out, return and weighing procedures. Typically, every reading table is also monitored by two video cameras 132, 134 from opposing angles. These cameras 132, 134 may be high-resolution and utilize a wide dynamic range to eliminate page washout that can result from lighting at the reading table. These cameras 132, 134 capture a specific reading table within their field of view so that item detail (such as, for example, a document page) is easily seen in the video data.

The cameras 130-134 are each adapted to capture a sequence of image frames and transmit the video/data to the server computer 104, which processes and stores the video/data. In the contemplated embodiment, the cameras 130-134 can be used for collecting and providing reviewable evidence of tampering and theft incidents, but the purpose of the system 100 is not limited to any one application. In some embodiments, additional processing can be performed on the video data to automate the detection of a suspected incident using the video data.

With continued reference to FIG. 1, the security system 100 includes a video storage device 136 that is part of or in communication with the tamper detection system 102. In one embodiment, the video storage device 136 is a video database being hosted on the server computer 104. The video database stores the video data with the corresponding record data, which includes, among other information, identification of the checked-out item under surveillance and dates and times of an associated check-out period.

With continued reference to FIG. 1, the security system 100 also includes a condition sensors 138, which may be located, for example in the closed storage location at the facility that is housing the item. The condition sensors 138 may take measurements of storage conditions, such as temperature and humidity. Additional or other conditions might be monitored. In some embodiments, the sensor 138 takes respective measurements in response to respective instructions from the processor 110. In other embodiments, the sensor 138 takes measurements at regular intervals.

With continued reference to FIG. 1, the security system 100 includes a historical database 140 that is part of, or in communication with, the tamper detection system 102. In one embodiment, the historical database 140 is hosted on the server or computer 104. In the preferred embodiment, the video database 136 and the historical database 140 reside on server or computer 104 and are tightly coupled to allow for quick investigation of alarm events. The historical database 140 stores the weight measurements with the corresponding record data, which includes, among other information, the item information, historical dates and times of check-out and return information, historical patron information, and condition measurements, etc.

The memory 112, 136, 140 may represent any type of tangible computer readable medium such as random access memory (RAM), read only memory (ROM), magnetic disk or tape, optical disk, flash memory, or holographic memory. In one embodiment, the memory 112, 136, 140 may each comprise a combination of random access memory, and read only memory. The at least one processor 110 can be variously embodied, such as by a single-core processor, a dual-core processor (or more generally by a multiple-core processor), a digital signal processor and cooperating math coprocessor, a digital controller, or the like. The at least one processor 110, in addition to controlling the operation of the respective tampering detection system 102, executes instructions stored in the memory 112 for performing the parts of the method outlined below.

The software modules as used herein, are intended to encompass any collection or set of instructions executable by the tamper detection system 102 so as to configure the server or computer 104 or other digital system to perform the task that is the intent of the software. The term "software" as used herein is intended to encompass such instructions stored in storage medium such as RAM, a hard disk, optical disk, or so forth, and is also intended to encompass "firmware" that is software stored on a ROM or so forth. Such software may be organized in various ways, and may include components organized as libraries, Internet-based programs stored on a remote server, source code, interpretive code, object code and/or directly executable code. It is contemplated that the software may invoke system-level code or calls to other software residing on the server or computer 104 or other locations to perform certain functions.

As will be appreciated, while one computing device 104 is illustrated by way of example, the system 100 may be hosted by more linked computing devices. Each computing device may include, for example, a server computer, desktop, laptop, or tablet computer, smartphone or any other computing device capable of implementing the method described herein.

Figure 2:
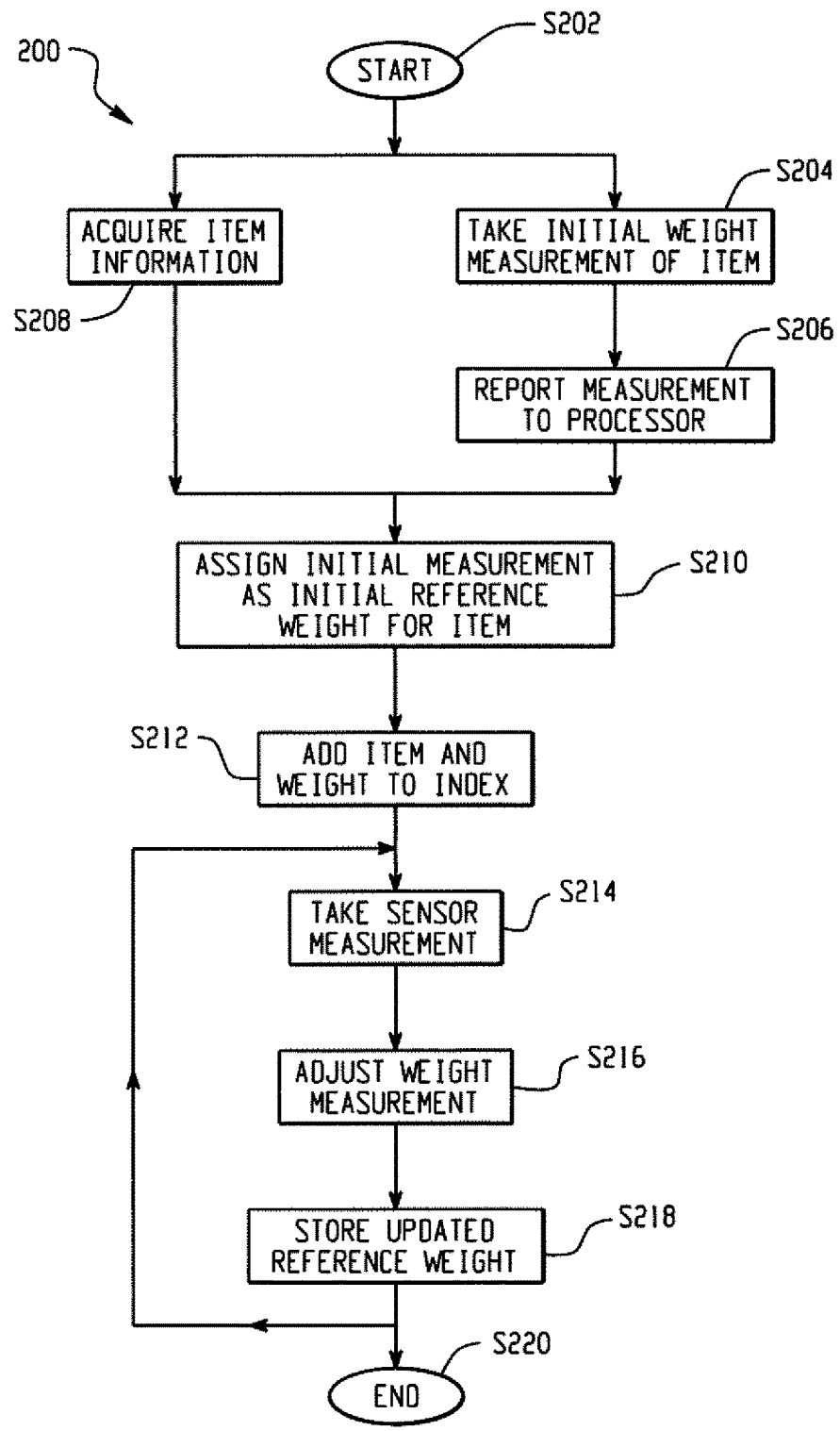
FIG. 2 is a flow chart illustrating a computer-implemented method for dynamically indexing special collection items according to one aspect of an exemplary embodiment.

The security system 100 uses weight measurements to track items, determine the condition of the item, and detect potential tampering and/or theft. FIG. 2 is a flow chart illustrating a computer-implemented method 200 for dynamically indexing the inventory of special collection items according to one aspect of the exemplary embodiment. The method starts at S202. After the scale is calibrated, at S204 the scale 126 takes an initial weight measurement of, for example, a special collections item placed thereon. The scale 126 reports the measurement to the processor 110 at S206. Parallel to this process, the server computer 104 acquires the item identification information, such as the name or title of the item and/or the identity of the item's author or creator, via user inputs at S208. At S210, the weight monitoring module 114 assigns the initial measurement as an initial reference weight for the special collections item. It is anticipated that every item in a particular collection will have a unique weight within at least the collection, because the scale 126 measures the weight at a high or ultra-high degree of precision and accuracy. At S212, the monitoring module 114 adds the item and weight to an index, which is stored in the historical database 140.

The monitoring module 114 builds the historical database 140 to include updated weight measurements over time. In an illustrative embodiment, the monitoring module 114 dynamically updates weight information of the indexed items using an adaptive algorithm that adjusts weight information based upon facility conditions, such as temperature and humidity. For instance, as noted above, in some embodiments, the condition sensor 138 is located in proximity to the closed storage location of the special collections items. The weight measurement for every item can change slightly compared to a reference or initial measurement based on storage conditions. Although the conditions are strictly regulated in the facility storage location, a slight variation may be observable as conditions vary. For instance, the temperature—which affects the humidity—can creep up or down over a period of several months. Additionally, the humidity can vary between different seasons. These conditions can affect the weight of the item because—in the case of a book or manuscript—paper holds different amounts of water at various humidities. The pages of a book or manuscript can absorb or give up water. Depending on the material, other objects, such as wood carvings, may be similarly affected by conditions, such as oxidation.

Because the scale 26 is a high precision scale that measures weight at a high level of accuracy and precision, the slightest variation in a measured weight to a reference weight might trigger an alarm. Therefore, the present system safeguards against false alarm events by dynamically compensating the reference weight measurement based on conditions. In one embodiment, the condition sensor 138 takes a condition measurement at S214, such as a temperature and/or a humidity measurement, at a predetermined interval. In the contemplated embodiment, the interval can be hourly or daily. The sensor 138 reports the measurement to the processor 110, which compensates the reference weight at S216 based on the condition(s) using the algorithm stored in the weight monitoring module 114. At S218, the compensated reference weight and corresponding record data are stored in the historical database 140. The dynamic updating procedure is repeated at predetermined intervals to compensate for any observable changes in the environmental conditions. The method ends at S220.

Figure 3:
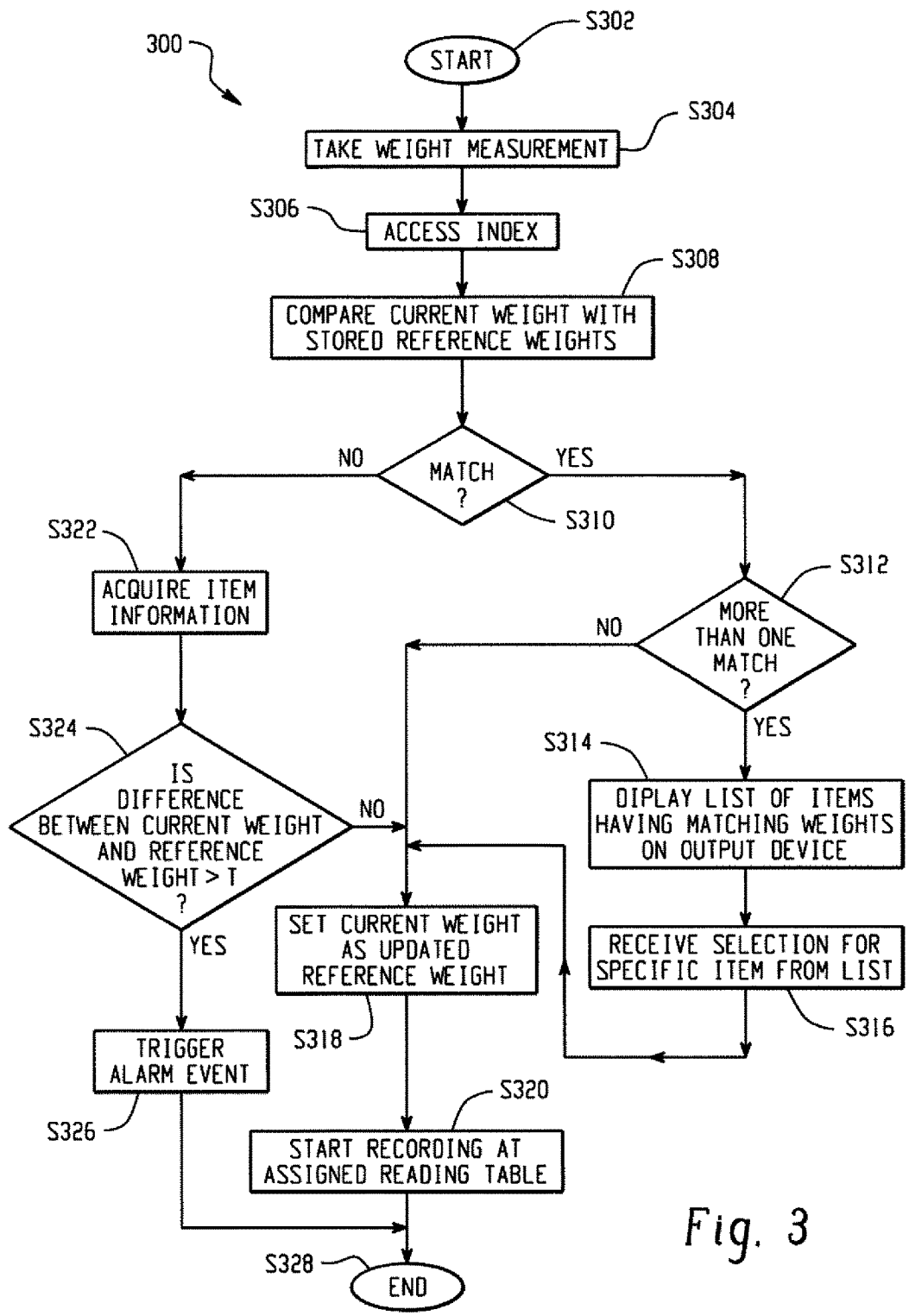
FIG. 3 is a flow chart illustrating a computer-implemented method for checking out a special collections item using a weight measurement, according to one aspect of an exemplary embodiment.

According to some embodiments, dynamic weight indexing is used as part of the item check-out and return procedures. FIG. 3 is a flow chart illustrating a method 300 for checking out a special collections item using weight measurement. When a patron seeks to check out an item, a librarian assists with retrieving the item from storage. As part of the check-out procedure, patron identification information may be entered into the system by user input. This process may include scanning a patron identification card or entering patron information, among other approaches. For example, the librarian or a patron can enter this information at the user device 106, which transmits the information to the server computer 104. The patron information is stored as record data corresponding with the check-out period. In some embodiments, item information can be entered into the system as user input. Alternatively, checkout is simplified by rapidly identifying the item and the item's check-out condition using weight measurement.

In response to the user placing the item onto the scale 126, the scale takes a weight measurement at S304. The scale reports the weight measurement to the processor 110, which accesses the database 140 of indexed items at S306. At S308, the check-out managing module 116 compares the current weight with the most recent data set of reference weights or compensated reference weights stored in the database. The module 116 can search for an exact match, or it can search for a near match. A "near match" is defined herein as a computed difference between the current weight and reference weights or compensated reference weights that falls within a predetermined allowable range (hereinafter referred to as the "first thresholding" operation). In the latter instance, an exact match may be difficult to obtain. External factors—such as, specs of dust settling on the item while it is in storage—can cause a precise weight measurement to fluctuate. While the weight indexing procedure dynamically updates or compensates weight information based on known conditions, other conditions may remain unknown. The module 116 determines if there is a match between the current weight and the stored data set of weights at S310. In response to at least one match being detected between the current item weight and a stored reference weight (YES at S310), the module 116 determines if there is more than one match at S312. As discussed, supra, it is anticipated that only one match in the database will exist based on the unique weight associated with every item and the precision of the scale. However, in the event that there are multiple matches between items of similar or overlapping weight (YES at S312), the module 116 displays a selectable list of matching weights on an interactive user interface 128 at S314. The system 100 allows a user to make a selection among the items on the list. At S316, the server computer 104 acquires the selection corresponding to a specific item on the list. The selection can be made by a single action of a user input device. In response to the item selection, the module 116 automatically populates and records the appropriate fields of information (date, time, patron identity) that is required to complete the check-out process. The module 116 stores this information in the database 136. The module 116 also assigns the current weight as the updated reference weight for the item at S318. The updated reference weight is added to the historical data, and is stored in the database 140.

Continuing with FIG. 3, in response to only one match being determined between the reference weights or compensated reference weights and the current weight of the item being checked-out (NO at S312), the module 116 identifies the item using the mapping of items to corresponding weights in the index, and automatically fills in and/or records the appropriate fields to complete the check-out process. The module 116 further sets the current weight as the updated reference weight for the identified item at S318. In one embodiment, the module 116 can optionally display the item information on the user interface 128 for verification, and continue with the updating procedure in response to a received verification by a single action of a user input device. After the updated reference weight is recorded, the module 116 instructs specific cameras 132, 134 to start recording (e.g., based on an assigned location where the item will be viewed by the patron). Standard video recorders typically record on motion, and store information for relatively short periods of time (days or weeks). The present system 100 executes algorithms that allow for continuous recording by cameras 132, 134 during the check-out period, patron review period and check-in.

Facilities have a designated reading room, or multiple reading rooms to which the patron is assigned. There is no limitation made herein to the process employed to assign the patron to a specific reading room or table. The location of the reading room and table is known, or becomes known, to the system 100. Similarly, the locations of all cameras 130-134 that belong to the system 100 are known and stored in a database. The processor instructs the specific cameras 132, 134 that are located at the assigned reading table and, for example, along any route thereto, to start recording at S320.

Continuing with FIG. 3, in response to no match being detected between the current item weight and a stored reference weight (NO at S310), the module 116 may ask the user to provide item information via the user interface 128. At S322, the processor 110 acquires the item information as a form of input, which can be transmitted from the user device. Using the item information, the module 116 accesses the index and determines the reference weight or compensated reference weight associated with the specified item. The module determines a difference between the current weight and the reference weight or compensated reference weight at S324. In response to the difference being less than a predetermined threshold (NO at S324) (the "second thresholding"), the process proceeds to S318 and sets the current weight as the updated reference weight for the item. An instance where no match was found does not automatically mean that the item has been tampered with. For example, a difference that is large enough to prompt a second thresholding may result if the scale needs to be recalibrated. However, an instance where no match is found suggests possible tampering of the item while in storage.

In response to the difference being greater than the predetermined threshold (YES at 8324)—signifying an underweight or overweight condition—the module 116 triggers an alarm event at S326. The method ends at S328.

Figure 4:
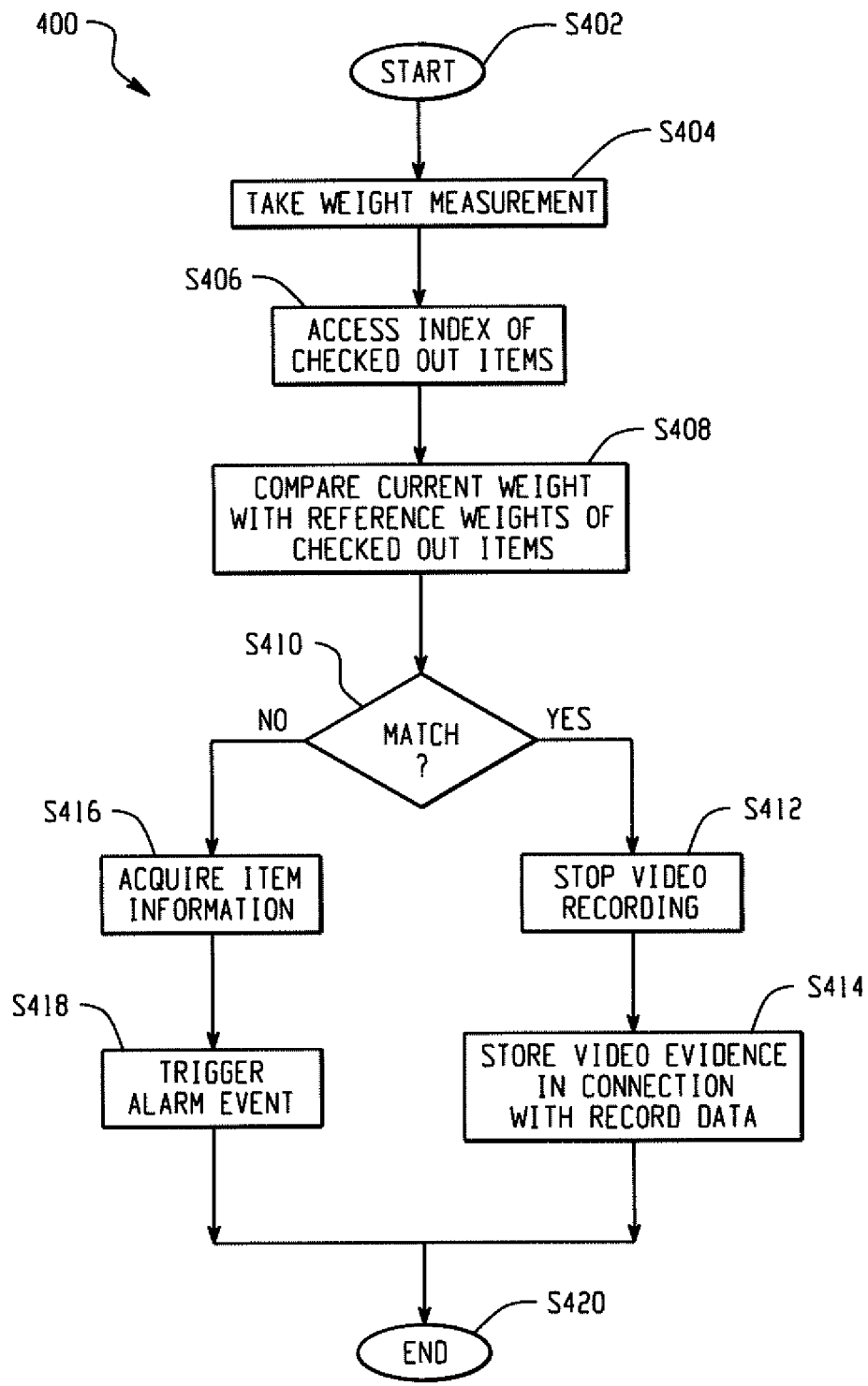
FIG. 4 is a flow chart illustrating a computer-implemented method for checking in a special collections item using a weight measurement, according to one aspect of an exemplary embodiment.

FIG. 4 is a flow chart illustrating a computer-implemented method 400 for returning the special collections item using a weight measurement, according to one aspect of the exemplary embodiment. This method 400 uses a weight measurement to determine the condition of the item on return or check-in, and specifically to detect potential tampering. The method starts at S402. In response to the user placing the returned item onto the scale 126, the scale takes a current weight measurement at S404. The scale 126 automatically reports the current weight measurement to the processor 110, which accesses the index or, in one embodiment, an index of checked-out items. In many facilities housing special collections, it is likely that many items can be checked out at any given time. The disclosure contemplates that the item being returned can be identified using weight in the same manner discussed in connection with FIG. 2, supra, and requires no user description input.

Particularly, the processor 110 accesses the reference weight or compensated reference weight assigned to the checked-out item at S406. The return managing module 118 compares the current weight measurement to the assigned reference weight or compensated reference weight at S408. The module 118 can search for an exact match, or it can search for a near match within a predetermined allowable range (the "third thresholding"). In response to the current weight of the returned item matching the assigned reference weight or compensated reference weight (YES at S410), the processor 110 stops the recording at S412 of both cameras 132, 134 monitoring the assigned reading room or table. The video data for both cameras 132, 134 is transmitted to the processor 110, which stores the video evidence in the video database 136 at S414. This video data is acquired from the cameras 132, 134 that captured the patron review and/or possession of the item at the assigned reading room and during the check-out period. The video segment starts at the check-out and stops upon return. In the contemplated embodiment, additional video that was captured by the motion-based camera 130 surveying the facility during the same time segment may also be stored in the video database 136. All video data is linked to the special collections item, and the record data in the historical database 140.

Continuing with FIG. 4, in response to the current weight of the returned item not matching the assigned reference weight (NO at S410), the module 118 can optionally prompt the user for item information or verification via the user interface 128. A difference in weights can indicate a potential tampering incident during the check-out period. For illustrative purposes, the weight upon return can be heavier than the check-out weight if markings were made on the rare item. The disclosure contemplates that the scale precisely measures weight at such accuracy that ink and other writing material is detectable through a change in weight. The item may be damaged by other materials that come into contact with it. Alternatively, an overweight condition may result from a foreign object (e.g., a Post-It® note) being been left on or in the item.

Similarly, an underweight condition is detected when a portion of the item was removed. As an illustrative example only, a corner or a portion of a page in a rare book may be stolen for a signature or other valuable piece of information. In another illustrative example, damage may only be a consequence of the fragility of the item, and not the result of an intentional act. Rare items must be handled with care. A portion may tear off accidently, and whether the patron would bring it to the attention of the librarian is not certain. Because the scale precisely measures weight at a high level of accuracy and precision, the system detects any change. Additionally, the system is difficult to thwart because of the precision scale. That is, a patron cannot simply replace a stolen portion with a substitute portion. To go undetected, the weights must be equal. In response to any change (NO at S410), the system triggers an alarm event at S418. The method ends at S420.

Figure 5:
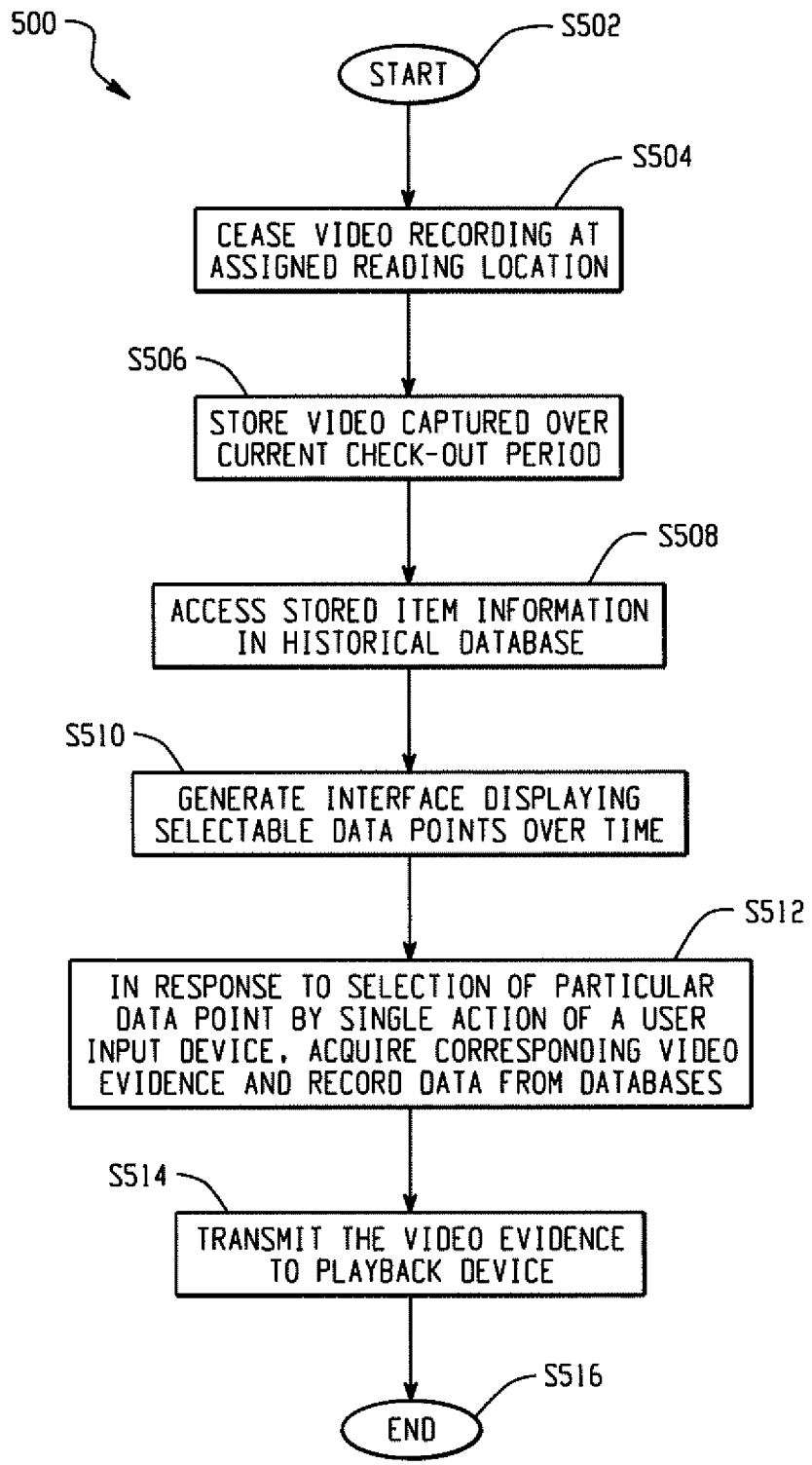
FIG. 5 is a flow chart illustrating a computer-implemented method for triggering an investigation in response to an alarm event, according to one aspect of an exemplary embodiment.

An alarm event starts the investigation process into why the weight has changed. FIG. 5 is a flow chart illustrating a method 500 for triggering an investigation in response to an alarm event, according to one aspect of the exemplary embodiment. The method starts at S502. As set forth, supra, an alarm event can be triggered when the weight of an item changes between the times when the item was placed in storage and retrieved from storage (See, FIG. 3), and/or when the item isn't returned in the same condition as when it was checked out (See, FIG. 4). In the latter instance, the return procedure may not have been completed if the alarm event was triggered. At S504, the processor stops the video recording. At S506, and similar to the operation described in connection with steps S412-S414, the video data captured over the current check-out period is acquired from cameras 130-134 and stored in connection with the special collections item in the video database 136.

Figure 6:
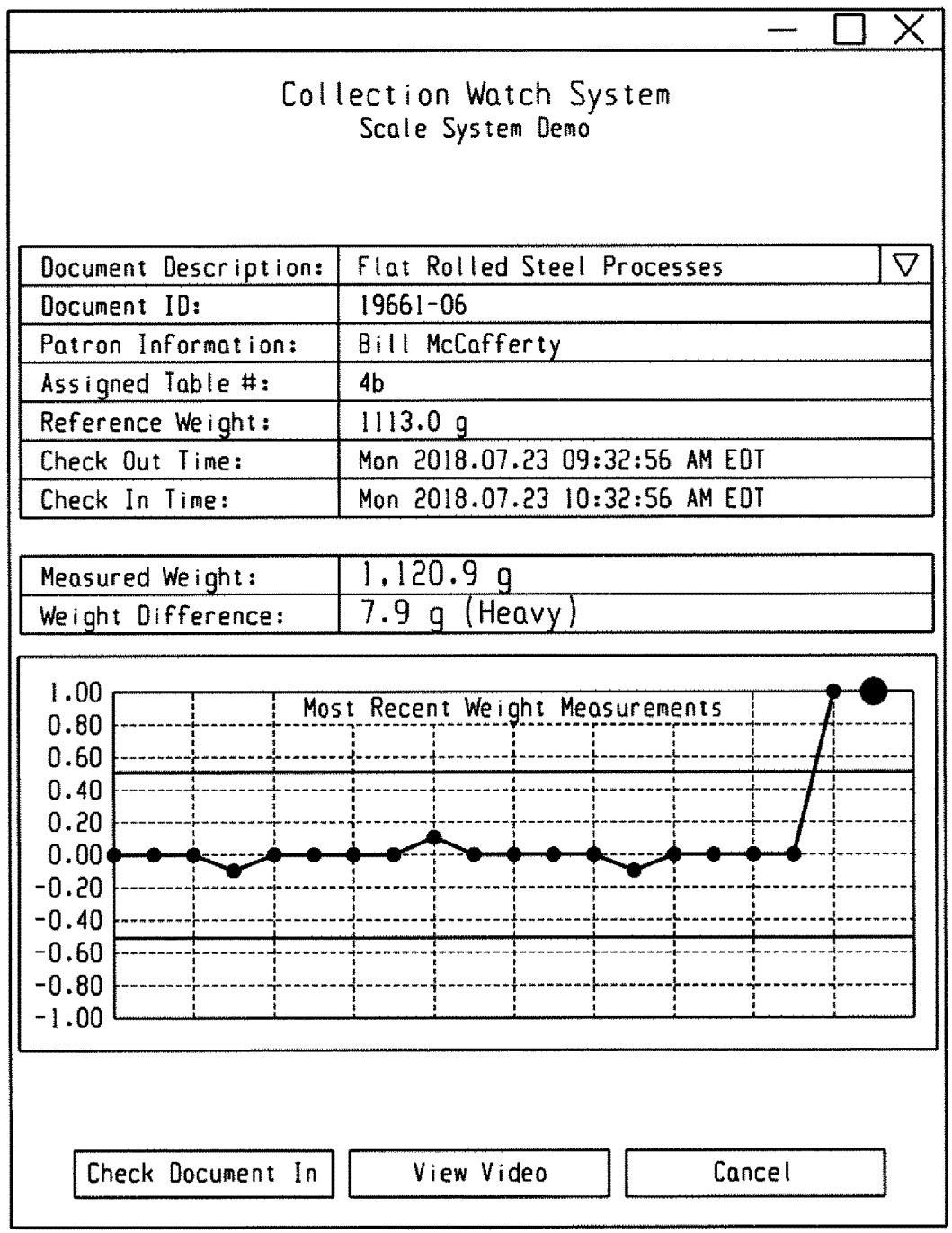
FIG. 6 is an illustrative screen display showing weight measurements of an item over time, as selectable data points.

At this point in the operation, the specific item information (for example, name, title, author or creator name, and/or other identification information) is known. Continuing with FIG. 5, the processor 110 accesses all the information associated with the item from the historical database at S508. The processor 110 generates an interactive interface displaying selectable data points over time. Specifically, each data point represents a weight measurement that was reported (and/or adjusted) at a point in time. FIG. 6 is an illustrative screen display showing the weight measurements over time, as selectable data points. While a graph in the form of a timeline is used for illustrative purposes, other formats can be employed to display a mapping of the measured weights over time. The purpose of the interface is to provide the user with an easily viewable historical comparison of measured weights from every check out and return occurrence associated with the document. Any weight that does not conform to the other data points is readily identifiable. Minor weight fluctuations are visible over time. These fluctuations can result from changes in facility conditions, which may be factored into an adjusted or compensated reference weight measurement. However, a larger change between successive data points may result from changes in the item condition.

Returning to FIG. 5, in response to a selection of a particular data point by a single action of a user input device, the processor 110 acquires corresponding video evidence and record data from the databases 136, 140 at S512. The alarm triggering module 120 instructs the processor 110 to transmit the video evidence to a playback device at S514. Additional record data is also transmitted to the user interface 128 for the user to review. If the weight of an item changes between viewings, for example, the librarian and/or patron who had access to the items are the initial parties for investigation. Therefore, the system immediately provides the record data and video options to a user, thus allowing the user to immediately review the video of the reading table and of the parties who had access to the item when the weight changed.

This evidence is provided as output and, more specifically, as part of an investigation that is automatically instituted if an alarm event is triggered. The system 100 allows the user to instantly view the video evidence at any point in time, and specifically links the video evidence with a weight discrepancy that is detected between successive measurements.

Therefore, the selection of any point on the graph will immediately access appropriate camera information and time frames, reading tables and patron information, and display pertinent video of the display check-out procedure. If a problem is identified with a particular patron, all video associated with that patron is made available in a similar manner. The method ends at S516.

One aspect of the disclosure is to employ a scale to monitor the condition of valuable items that are made accessible to the public. The scale allows for problems to be quantitatively identified and immediately addressed in a proactive manner.

The extreme accuracy of the scale provides a unique method for quantitatively identifying items by weight during check-out. By employing the scale during the check-out procedure, the system can search the index for a corresponding item with a matching weight—simplifying and shortening the check-out procedure. The scale eliminates the steps involving manual entry of related check-out information, and reduces the risk of operator error.

By incorporating the scale as part of the check-out procedure, the system can further quantitatively, and automatically, detect a change in the condition of the item while it is in storage.

By employing the scale as part of the return procedure, the system further automates the inspection of a returned item. The scale provides a weight that can be used to verify that the item is returned fully intact after it was consulted by a patron. By employing a quantitative measure in the return procedure, the system allows for the immediate detection of a change in the condition of a returned item. Incorporation of the scale in the disclosed system reduces and/or eliminates the risk of human error that may result from a subjective, manual inspection of the item.

Another aspect of embodiments is to employ a condition sensor for adjusting or compensating weight measurements based on conditions of the storage environment. By introducing the condition sensor in combination with the other hardware, the system does not require that special collections items be retrieved and handled multiple times over the storage period to update the reference weight.

Another aspect of embodiments is to employ at least one video capture device that is tightly integrated with the weight monitoring hardware. Video evidence is recorded by at least one specialized camera that records video evidence during the check-out, viewing and check-in periods, so that a manual inspection of the item is not required on its return. The newly coupled video automatically stores video based on document, patron and table location, which simplifies the review process that is performed as part of an investigation.

Another aspect of embodiments is a system that automatically presents evidence needed for an investigation in response to a potential tampering incident. The disclosed system securely logs and stores the record and video data corresponding with each weight measurement for historical comparison, thus simplifying the investigation. The historical comparison of weights and video analysis assists in the immediate identification of when (time) a condition change occurs, thus eliminating the step requiring that all check-out periods be initially identified.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A security system for quantitatively verifying a condition of items in a special collections inventory made available for consultation, the system comprising:
   a scale in connection with an index of special collection items stored on a computing device in communication with the scale, the scale for taking a current weight measurement of a special collections item and automatically reporting the current weight measurement to the computing device;
   a non-transitory storage device having stored thereon instructions for:
      accessing the index of special collections items, wherein every item in the index has a unique weight within a collection;
      using the current weight measurement, searching the index for a given item by comparing the current weight measurement with a set of indexed reference weights;
      in response to a match between the current weight measurement and a reference weight among the set of indexed reference weights, identifying the given item corresponding with the reference weight and verifying a physical condition of the given item as being intact; and
      in response to no match between the current weight measurement and the set of indexed reference weights, triggering an alarm event indicating tampering of the special collections item; and
   at least one hardware processor being part of the computing device and configured to execute the instructions.

2. The security system according to claim 1, further comprising a condition sensor in communication with the hardware processor, the condition sensor for:

in response to instruction from the hardware processor, taking an environmental measurement in a closed storage location housing the items in the special collections inventory; and transmitting the environmental measurement to the processor.

3. The security system according to claim 2, wherein the hardware processor is further operative to execute instructions for dynamically updating the current weight measurement for the item in the index of special collections items, the updating including:

compensating the current weight measurement of the item based on the environmental measurement; and assigning the compensated weight measurement as an updated reference weight for the item.

4. The security system according to claim 1, further comprising at least one image capture device in communication with the hardware processor, the at least one image capture device for:

in response to instruction from the hardware processor, continuously recording video until receiving an instruction to stop from the hardware processor; and transmitting the video to the hardware processor.

5. The security system according to claim 4, wherein the hardware processor further executes instructions for:

accessing location information of the at least one image capture device;

instructing the at least one image capture device to record video based on a given location;

storing the video in a database being hosted on the computing device; and mapping the video to a current weight measurement and one of check-in and check-out time for the given item.

6. The security system according to claim 1, further comprising at least one image capture device in communication with the hardware processor, the at least one image capture device for:

recording video when triggered by observed motion, the image capture device being positioned to monitor patrons across a camera field of view; and transmitting the video to the hardware processor.

7. The security system according to claim 6, wherein the hardware processor further executes instructions for:

storing the video in a database being hosted on the computing device; and mapping the video to the reference weights and time.

8. The security system according to claim 1, further comprising a user device in communication with the hardware processor, the user device including:

a user interface for displaying video transmitted from the hardware processor.

9. The security system according to claim 8, wherein the hardware processor further executes instructions for:

in response to the alarm event, generating an interactive interface at the user device, the interactive interface displaying historical weights as selectable data points over time;

in response to a selection of a given data point by single action of a user input device, accessing a database hosted on the computing device;

acquiring from the database video associated with the data point; and transmitting the video to the user device.

10. The system according to claim 8, wherein the hardware processor further executes instructions for:

in response to determining multiple reference weights matching the current weight, generating an interactive interface at the user device, the interactive interface displaying a selectable list of indexed items each associated with a matching reference weight;

in response to a selection of one item by single action of a user input device, automatically populating item identification information in a record associated with the selected item;

storing the current weight measurement, the record, and one of check-out and return time information in a database hosted on the computing device; and assigning the current weight measurement as an updated reference weight for the selected item.

11. The system according to claim 1, wherein the hardware processor further executes instructions for:

in response to the match between the current weight measurement and the reference weight, automatically populating identification information in a record associated with the given item;

storing the current weight measurement, the record, and one of check-out and return time information in a database hosted on the computing device; and assigning the current weight measurement as an updated reference weight for the given item.

12. The system according to claim 1, the hardware processor further executing instructions for:

maintaining historical data of weight measurements for the given item, each weight measurement being mapped to one of a check-out and return time.

13. A computer-implemented method for quantitatively verifying a condition of items in a special collections inventory made available for consultation, the method comprising:

providing a scale operatively connected to a server computer;

at the scale, taking a current weight measurement of a special collections item and automatically reporting the current weight measurement to the server computer;

at the server computer, accessing an index of the special collections items, wherein every item in the index has a unique weight within a collection, using the current weight measurement, searching the index for a given item by comparing the current weight measurement with a set of indexed reference weights, in response to a match between the current weight measurement and a reference weight among the set of indexed reference weights, identifying the given item corresponding with the reference weight and verifying a physical condition of the given item as being intact, and in response to no match between the current weight measurement and the set of indexed reference weights, triggering an alarm event indicating tampering of a designated special collections item.

14. The computer-implemented method according to claim 13, further comprising:

providing a condition sensor in communication with the server computer;

at the condition sensor, in response to instruction from the hardware processor, taking an environmental measurement in a closed storage location housing the items in the special collections inventory; and at the server computer, dynamically updating the current weight measurement for the item in the index of special collections items, the updating including:

compensating the current weight measurement of the item based on the environmental measurement, and assigning the compensated weight measurement as the reference weight for the item.

15. The computer-implemented method according to claim 13, further comprising:
providing at least one image capture device in communication with the server computer;
at a first image capture device, in response to instruction from the hardware processor, continuously recording first video until receiving an instruction to stop recording from the server computer, and transmitting the first video to the server computer; and
at a second image capture device, recording second video when triggered by observed motion, the second image capture device being positioned to monitor patrons as they move to and from reading tables, and
transmitting the second video to the server computer.

16. The computer-implemented method according to claim 15, further comprising:
at the server computer, storing the first and second videos in a database being hosted on the computing device, and
mapping the first and second videos to the current weight measurement and time.

17. The computer-implemented method according to claim 13, further comprising:
providing a user device in communication with the server computer, the user device including a user interface for displaying video transmitted from the database.

18. The computer-implemented method according to claim 13, further comprising:
at the server computer, in response to the alarm event, generating an interactive interface at the user device, the interactive interface displaying historical weights as selectable data points over time,
in response to a selection of a given data point by single action of a user input device, accessing a database hosted on the computing device,
acquiring from the database video associated with the data point, and
transmitting the video to the user device.

19. The computer-implemented method according to claim 13, further comprising:
at the server computer, automatically populating item identification information in a record associated with the given item,
storing the current weight measurement, the record, and one of check-out and return time information in a database hosted on the server computer, and
assigning the current weight as an updated reference weight for the given item.

20. A computer program product comprising a non-transitory computer-readable storage medium having program code embodied therewith, the program code executable by at least one hardware processor to perform the method of claim 13.

* * * * *